United States Patent
Jiang

(10) Patent No.: US 11,291,042 B2
(45) Date of Patent: Mar. 29, 2022

(54) METHOD AND APPARATUS FOR CONFIGURING RANDOM ACCESS

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 32 days.

(21) Appl. No.: 16/651,981

(22) PCT Filed: Sep. 29, 2017

(86) PCT No.: PCT/CN2017/104595
§ 371 (c)(1),
(2) Date: Mar. 27, 2020

(87) PCT Pub. No.: WO2019/061357
PCT Pub. Date: Apr. 4, 2019

(65) Prior Publication Data
US 2020/0260484 A1    Aug. 13, 2020

(51) Int. Cl.
*H04W 74/00* (2009.01)
*H04W 28/02* (2009.01)
*H04W 74/08* (2009.01)

(52) U.S. Cl.
CPC ..... *H04W 74/008* (2013.01); *H04W 28/0268* (2013.01); *H04W 74/006* (2013.01); *H04W 74/0833* (2013.01)

(58) Field of Classification Search
None
See application file for complete search history.

(56) References Cited

U.S. PATENT DOCUMENTS

2012/0033613 A1   2/2012  Lin et al.
2012/0149422 A1   6/2012  Ye et al.
(Continued)

FOREIGN PATENT DOCUMENTS

CN    102316601 A1    1/2012
CN    102740374 A     10/2012
(Continued)

OTHER PUBLICATIONS

International Search Report of PCT Application No. PCT/CN2017/104595 dated Jun. 27, 2017 with English translation, (4p).
(Continued)

*Primary Examiner* — Joseph E Avellino
*Assistant Examiner* — The Hy Nguyen
(74) *Attorney, Agent, or Firm* — Arch & Lake LLP

(57) ABSTRACT

A method for configuring random access, comprising: initiating, by a user equipment, a random access to a base station; receiving an association relationship between a random access adjustment parameter and a type of the random access from the base station, wherein the type of the random access is associated with a tolerant latency of the random access; determining whether a random access response transmitted by the base station with respect to the random access is received within a predetermined duration upon initiation of the random access; determining the type of the random access upon it is determined that the random access response is not received; determining a random access adjustment parameter corresponding to the random access according to the association relationship; and re-initiating the random access to the base station according to the random access adjustment parameter.

20 Claims, 9 Drawing Sheets

(56) References Cited

U.S. PATENT DOCUMENTS

| | | | |
|---|---|---|---|
| 2016/0143063 A1 | 5/2016 | Lin et al. | |
| 2017/0013443 A1* | 1/2017 | Gopalakrishnan | H04W 68/02 |
| 2018/0035469 A1* | 2/2018 | Chen | H04W 72/10 |
| 2018/0317264 A1* | 11/2018 | Agiwal | H04W 52/50 |
| 2018/0324716 A1* | 11/2018 | Jeon | H04W 74/0833 |
| 2019/0327770 A1* | 10/2019 | Liu | H04W 74/08 |
| 2019/0373643 A1* | 12/2019 | Tang | H04W 74/0833 |
| 2020/0022038 A1* | 1/2020 | Han | H04W 74/006 |
| 2020/0128582 A1* | 4/2020 | Chen | H04W 74/008 |
| 2020/0229235 A1* | 7/2020 | Lu | H04W 74/0833 |
| 2020/0275477 A1* | 8/2020 | Shah | H04W 74/004 |

FOREIGN PATENT DOCUMENTS

| | | |
|---|---|---|
| CN | 102892177 A1 | 1/2013 |
| CN | 103957603 A | 7/2014 |
| WO | 2009117601 A1 | 9/2009 |

OTHER PUBLICATIONS

CMCC et al "GCF Priority 1—Update of E-UTRA MAC test case 7.1.2.4", 3GPP TSG-RAN WG5 Meeting #44, R5-094761, Aug. 28, 2009 (10p).

First Office Action of Chinese Application No. 201780001440.0 dated Apr. 14, 2021, (18p).

NTT DOCOMO, et al., RAN2 aspects on random access procedure for NR, 3GPP TSG-RAN WG2 #96 R2-168035; Nov. 5, 2016, (4p).

\* cited by examiner

METHOD AND APPARATUS FOR CONFIGURING RANDOM ACCESS

CROSS-REFERENCE TO RELATED APPLICATIONS

This application is a national phase application based on PCT/CN2017/104595, filed on Sep. 29, 2017, the content of which is incorporated herein by reference.

TECHNICAL FIELD

The present disclosure relates to the field of communications technologies, and in particular, to a method and apparatus for configuring random access, and an electric device and a computer-readable storage medium thereof.

BACKGROUND

In a random access process, after initiating a random access, if a user equipment does not receive a random access response transmitted by a base station with respect to the random access, the user equipment may re-initiate a random access to the base station according to a fixed parameter.

SUMMARY

To overcome the problem existing in the related art, the present disclosure provides a method and apparatus for configuring random access, and an electric device and a computer-readable storage medium to overcome the defect in the related art.

According to the first aspect of embodiments of the preset disclosure, a method for configuring random access is provided. The method is implemented by a user equipment and includes:

initiating a random access to a base station;

receiving an association relationship between a random access adjustment parameter and a type of the random access from the base station, wherein the type of the random access is associated with a tolerant latency of the random access;

determining whether a random access response transmitted by the base station with respect to the random access is received within a predetermined duration upon initiation of the random access;

determining the type of the random access upon it is determined that the random access response is not received;

determining a random access adjustment parameter corresponding to the random access according to the association relationship; and re-initiating the random access to the base station according to the random access adjustment parameter.

According to the second aspect of embodiments of the present disclosure, an apparatus for configuring random access is provided. The apparatus is implemented by a user equipment and includes:

a processor; and a memory for storing instructions executable by the processor;

wherein the processor is configured to perform the followings:

initiating a random access to a base station;

receiving an association relationship between a random access adjustment parameter and a type of the random access from the base station, wherein the type of the random access is associated with a tolerant latency of the random access;

determining whether a random access response transmitted by the base station with respect to the random access is received within a predetermined duration upon initiation of the random access; and determining the type of the random access upon it is determined that the random access response is not received; and determining a random access adjustment parameter corresponding to the random access according to the association relationship;

wherein the processor is further configured to perform re-initiating the random access to the base station according to the random access adjustment parameter.

According to the third aspect of embodiments of the present disclosure, an electronic device is provided. The device includes:

a processor; and a memory for storing instructions executable by the processor;

wherein the processor is configured to:

initiate a random access to a base station;

receive an association relationship between a random access adjustment parameter and a type of the random access from the base station, wherein the type of the random access is associated with a tolerant latency of the random access;

determine whether a random access response transmitted by the base station with respect to the random access is received within a predetermined duration upon initiation of the random access;

determine the type of the random access upon it is determined that the random access response is not received;

determine a random access adjustment parameter corresponding to the random access according to the association relationship; and re-initiate the random access to the base station according to the random access adjustment parameter.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
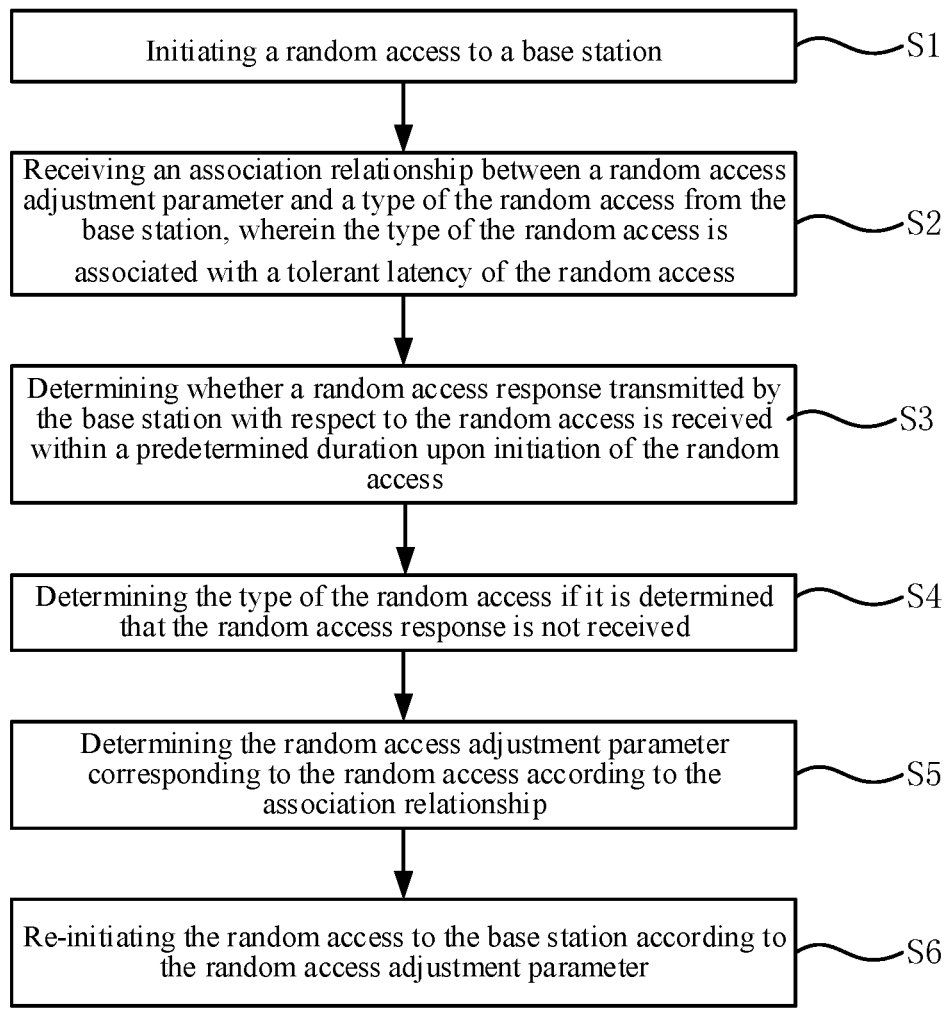
FIG. 1 is a schematic flowchart of a method for configuring random access according to an exemplary embodiment of the present disclosure.

Exemplary embodiments are described in retail herein, and examples thereof are embodied in the accompanying drawings. Where the description hereinafter relates to the accompanying drawings, unless otherwise specified, identical reference numerals in the accompanying drawings denote identical or like elements. Implementation manners described in the following exemplary embodiments do not necessarily represent all the implementation manners consistent with the present disclosure. On the contrary, these implementation manners are merely examples illustrating apparatuses and methods according to some aspects of the present disclosure, as described in the appended claims.

There are various types of random accesses, and with respect to different types of the random accesses, if the random access to the base station is re-initiated according to the same parameter, resources occupied by various type of random access may be unreasonable due to no consideration of characteristics of different types of the random accesses.

FIG. 1 is a schematic flowchart of a method for configuring random access according to an exemplary embodiment of the present disclosure. The method according to this embodiment may be implemented by a user equipment, such as, a mobile phone, a tablet or the like. As illustrated in FIG. 1, the method according to this embodiment may include the following steps:

In step S1, a random access is initiated to a base station. For example, a preamble is transmitted to the base station.

In step S2, an association relationship between a random access adjustment parameter and a type of the random access is received from the base station, wherein the type of the random access is associated with a tolerant latency of the random access.

It should be noted that an execution sequence of step S1 and step S2 may be adjusted as required. For example, as illustrated in FIG. 1, step S2 may be performed after step S1, or step S2 may be performed before step S1.

In step S3, whether a random access response transmitted by the base station with respect to the random access is received within a predetermined duration upon initiation of the random access is determined, and step S4 is performed upon it is determined that the random access response is not received.

In step S4, the type of the random access is determined.

In step S5, the random access adjustment parameter corresponding to the random access is determined according to the association relationship.

In step S6, the random access is re-initiated to the base station according to the random access adjustment parameter.

In one embodiment, the type of the random access may be determined by the user equipment itself, or may be determined by receiving a message from the base station. Specific implementation may be described in detail in the following embodiments.

In one embodiment, different random access adjustment parameters may be pre-defined with respect to different types of random accesses, and the association relationship between the random access adjustment parameter and the type of the random access may be established.

In one embodiment, the types of the random accesses may be categorized according to tolerant latencies (for example, maximum latency tolerant by the random accesses) of the random accesses. For example, the types may include an extremely-low latency type, a low-latency type, a medium-latency time, a high-latency type and the like.

In one embodiment, the random access adjustment parameter includes, but not limited to: a backoff time coefficient, and/or a backoff time value, and/or a power ramping step coefficient, and/or a power ramping step value. The random access adjustment parameter may be positively correlated with the tolerant latency of the random access. That is, the lower the tolerant latency of the random access, the smaller the backoff time coefficient.

In one embodiment, the association relationship between the random access adjustment parameter and the type of the random access may include a preset table with different coefficient values associated with different types of latency types. One example of the association relationship is illustrated in Table 1.

TABLE 1

| Type | Parameter | |
|---|---|---|
| | Backoff time coefficient | Power ramping step coefficient |
| Extremely-low latency type | 0.2 | 0.2 |
| Low-latency type | 0.5 | 0.5 |
| Medium-latency type | 1 | 1 |
| High-latency type | 1.5 | 1.5 |

It should be noted that Table 1 illustrates only one example of the association relationship between the random access adjustment parameter and the type of the random access. Besides two parameters listed in Table 1, other random access adjustment parameters may also be included in the association relationship. In addition, the two parameters with respect to the same random access type may be the same as listed in Table 1 or may be adjusted to be different as needed.

The random access of the extremely-low latency type includes a random access with a 5G QoS (Quality of Service) index (5QI) or a QoS Flow Index (QFI) being an ultra reliably low latency communication (URLLC) service, or a switched random access, or a secondary cell group (SCG) addition/modification.

The random access of the low-latency type includes a random access with the 5QI or the QFI being a real-time online game or a vehicle-object communication.

The random access of the medium-latency type includes a mobile originating signaling (MO signaling), a mobile incoming signaling (MT signaling), a system information request (SI request), positioning, and a random access with the 5QI or the QFI being live streaming.

The random access of the high-latency type includes time alignment, and a random access with the 5QI or the QFI being buffered streaming.

In one embodiment, upon receiving the random access initiated by the user equipment, the base station may transmit the association relationship between the random access adjustment parameter and the type of the random access to the user equipment that initiates the random access; and upon receiving the association relationship, the user equipment may determine the type of the initiated random access, and thus may further determine the random access adjustment parameter corresponding to the initiated random access according to the determined type of the random access and the received association relationship between the random access adjustment parameter and the type of the random access.

Further, upon the user equipment determines that a random access response (RAR) with respect to a random access is not received within a predetermined duration upon initiation of the random access, for example, the received random access response includes backoff time indicated by the base station instead of including an identifier of the user equipment, then the user equipment may determine that the random access response transmitted by the base station with respect to the random access is not received, and needs to re-initiate the random access when the backoff time elapses.

Hence, the random access adjustment parameter corresponding to the random access may be determined according to the association relationship, and the random access may be re-initiated to the base station according to the random access adjustment parameter, such that the user equipment may re-initiate the random access to the base station according to features of different types of random accesses. In this way, the user equipment may re-initiate different types of the random accesses more reasonably, which improves rationality of resource occupation by the random access.

For example, based on the above embodiment, if the random access adjustment parameter includes a backoff time coefficient k1, the random access may be re-initiated to the base station according to the random access adjustment parameter. For example, the backoff time indicated by the base station may be adjusted according to the backoff time coefficient, and the adjusted backoff time may be obtained by multiplying the backoff time with the backoff time coefficient using this equation: backoff=k1×backoff. For example, based on the embodiment illustrated in Table 1, the lower the tolerant latency of the random access, the smaller the backoff time coefficient K1, and thus, with respect to the random access with a lower tolerant latency, the user equipment may re-initiate the random access more quickly relative to the random access with a higher tolerant latency, so as to reduce time for waiting for the random access and to satisfy the tolerant latency.

Figure 2:
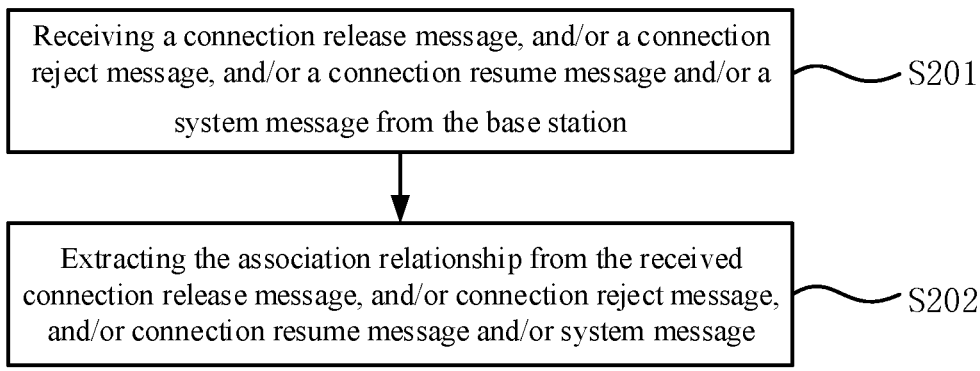
FIG. 2 is a schematic flowchart of a process of receiving an association relationship between a random access adjustment parameter and a type of a random access from a base station according to an exemplary embodiment of the present disclosure.

FIG. 2 is a schematic flowchart of a process of receiving an association relationship between a random access adjustment parameter and a type of a random access from a base station according to an exemplary embodiment of the present disclosure. As illustrated in FIG. 2, and based on the embodiment as illustrated in FIG. 1, in case that the user equipment is in an idle state or in an inactive state, receiving the association relationship between the random access adjustment parameter and the type of the random access from the base station includes the following steps:

In step S201, a connection release message, and/or a connection reject message, and/or a connection resume message and/or a system message from the base station is received.

In step S202, the association relationship is extracted from the received connection release message, and/or connection reject message, and/or connection resume message and/or system message.

In one embodiment, in case that the user equipment is in the idle state or in the inactive state, the base station may transmit the connection release message, and/or the connection reject message, and/or the connection resume message and/or system message to the user equipment, and may carry the association relationship between the random access adjustment parameter and the type of the random access in the connection release message, and/or the connection reject message, and/or the connection resume message and/or the system message, such that the user equipment may extract the association relationship from the received connection release message, and/or connection reject message, and/or connection resume message and/or system message.

Figure 3:
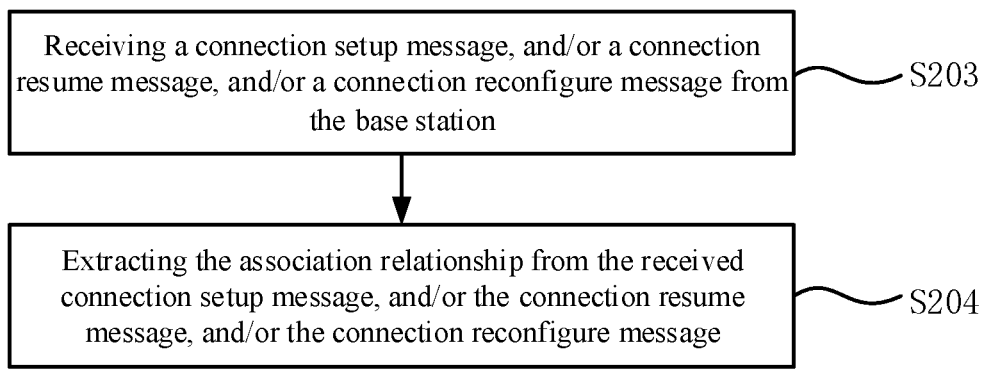
FIG. 3 is a schematic flowchart of another process of receiving the association relationship between the random access adjustment parameter and the type of the random access from the base station according to an exemplary embodiment of the present disclosure.

FIG. 3 is another schematic flowchart of another process of receiving the association relationship between the random access adjustment parameter and the type of the random access from the base station according to an exemplary embodiment of the present disclosure. As illustrated in FIG. 3, and based on the embodiment as illustrated in FIG. 1, in case that the user equipment is in an idle state or in an inactive state, receiving the association relationship between the random access adjustment parameter and the type of the random access from the base station includes the following steps:

In step S203, a connection setup message, and/or a connection resume message, and/or a connection reconfigure message from the base station is received.

In step S204, the association relationship is extracted from the received connection setup message, and/or the connection resume message, and/or the connection reconfigure message.

In one embodiment, in case that the user equipment is in the connected state, the base station may transmit the connection setup message, and/or the connection resume message, and/or the connection reconfigure message to the user equipment, and may carry the association relationship between the random access adjustment parameter and the type of the random access in the connection setup message, and/or the connection resume message, and/or the connection reconfigure message, such that the user equipment may extract the association relationship from the received connection setup message, and/or the connection resume message, and/or the connection reconfigure message.

Figure 4:
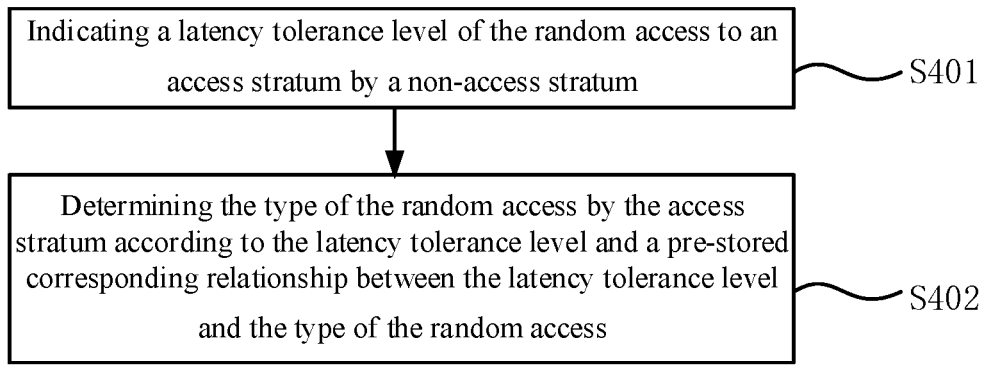
FIG. 4 is a schematic flowchart of a process of determining the type of the random access according to an exemplary embodiment of the present disclosure.

FIG. 4 is a schematic flowchart of a process of determining the type of the random access according to an exemplary embodiment of the present disclosure. As illustrated in FIG. 4, based on the embodiment as illustrated in FIG. 1, in case that the user equipment is in an idle state, in an inactive state or in a connected state and the process of the random access includes transmitting data to the base station by the user equipment, determining the type of the random access includes the following steps:

In step S401, a non-access stratum indicates a latency tolerance level of the random access to an access stratum.

In step S402, The access stratum determines the type of the random access according to the latency tolerance level and a pre-stored corresponding relationship between the latency tolerance level and the type of the random access.

In one embodiment, with respect to a case where the user equipment is in the idle state, in the inactive state or in the connected state, when the process of initiating the random access to the base station by the user equipment includes transmitting data (that is, uplink data) to the base station by the user equipment, the user equipment may determine the type of the random access that is initiated by the user equipment. Specifically, the non-access stratum (NAS) of the user equipment may transmit an indication to the access stratum (AS), and the access stratum maps the latency tolerance level to the corresponding type of the random access according to the latency tolerance level and the pre-stored corresponding relationship between the latency tolerance level and the type of the random access, such that the type of the random access is determined.

Figure 5:
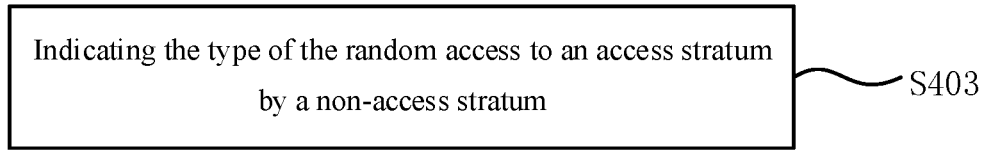
FIG. 5 is a schematic flowchart of another process of determining the type of the random access according to an exemplary embodiment of the present disclosure.

FIG. 5 is a schematic flowchart of another process of determining the type of the random access according to an exemplary embodiment of the present disclosure. As illustrated in FIG. 5, based on the embodiment as illustrated in FIG. 1, in case that the user equipment is in an idle state, in an inactive state or in a connected state and the process of the random access includes transmitting data to the base station by the user equipment, determining the type of the random access includes:

In step S403, a non-access stratum indicates the type of the random access to an access stratum.

In one embodiment, with respect to a case where the user equipment is in the idle state, in the inactive state or in the connected state, when the process of initiating the random access to the base station by the user equipment includes transmitting data to the base station by the user equipment, the user equipment may determine the type of the random access that is initiated by the user equipment. Specifically, the non-access stratum of the user equipment may directly indicate the type of the random access to the access stratum.

Figure 6:
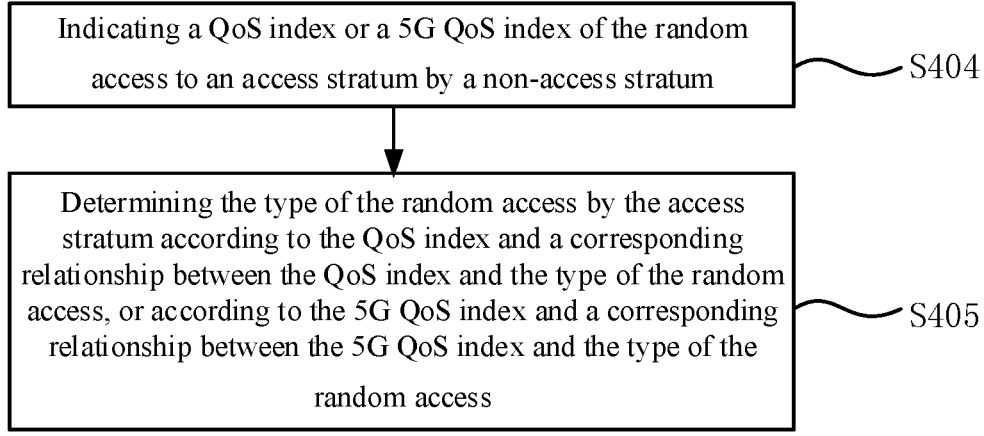
FIG. 6 is a schematic flowchart of another process of determining the type of the random access according to an exemplary embodiment of the present disclosure.

FIG. 6 is a schematic flowchart of another process of determining the type of the random access according to an exemplary embodiment of the present disclosure. As illustrated in FIG. 6, based on the embodiment as illustrated in FIG. 1, in case that the user equipment is in an idle state, in an inactive state or in a connected state and the process of the random access includes transmitting data to the base station by the user equipment, determining the type of the random access includes the following steps:

In step S404, a non-access stratum indicates a QoS index or a 5G QoS index of the random access to an access stratum.

In step S405, the access stratum determines the type of the random access according to the QoS index and a corresponding relationship between the QoS index and the type of the random access, or according to the 5G QoS index and a corresponding relationship between the 5G QoS index and the type of the random access.

In one embodiment, with respect to a case where the user equipment is in the idle state, in the inactive state or in the connected state, when the process of initiating the random access to the base station by the user equipment includes transmitting data to the base station by the user equipment, the user equipment may determine the type of the random access that is initiated by the user equipment. Specifically, the non-access stratum may indicate the QoS index or the 5G QoS index of the initiated random access to the access stratum, the access stratum may determine the type of the random access according to the QoS index and the corresponding relationship between the QoS index and the type of the random access, or according to the 5G QoS index and the corresponding relationship between the 5G QoS index and the type of the random access.

Figure 7:
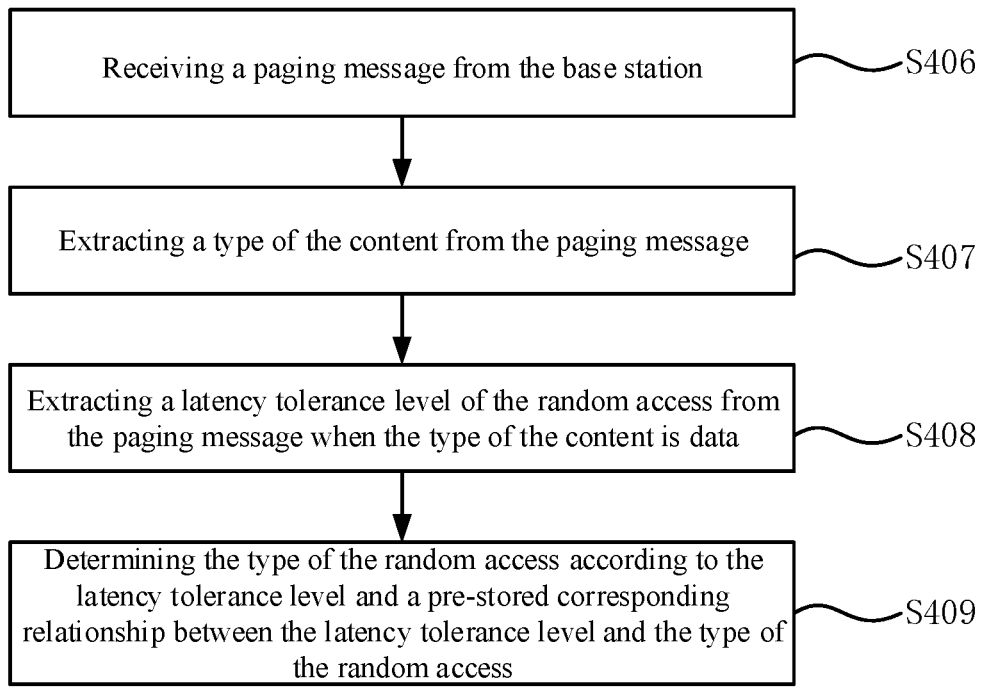
FIG. 7 is a schematic flowchart of another process of determining the type of the random access according to an exemplary embodiment of the present disclosure.

FIG. 7 is a schematic flowchart of another process of determining the type of the random access according to an exemplary embodiment of the present disclosure. As illustrated in FIG. 7, based on the embodiment as illustrated in FIG. 1, in case that the user equipment is in an idle state or in an inactive state and the process of the random access includes receiving content from the base station by the user equipment, determining the type of the random access includes the following steps:

In step S406, a paging message is received from the base station.

In step S407, a type of the content is extracted from the paging message.

In step S408, when the type of the content is data, a latency tolerance level of the random access is extracted from the paging message.

In step S409, the type of the random access is determined according to the latency tolerance level and a pre-stored corresponding relationship between the latency tolerance level and the type of the random access.

In one embodiment, with respect to a case where the user equipment is in the idle state or in the inactive state, when the process of initiating the random access to the base station by the user equipment includes receiving content from the base station by the user equipment, the user equipment may not determine the type of the content and the type of the random access. In this case, the type of the content may be indicated in the paging message broadcast by the base station, and the type of the random access may be indirectly indicated.

Specifically, the latency tolerance level of the random access may be indicated in the paging message, such that the user equipment may extract the type of the content from the paging message, and in the case where the content is data (that is, downlink data, the content may also be a signaling, and the indication may be given not according to this embodiment in the case where the content is the signaling), may further extract the latency tolerance level form the paging message, such that the type of the random access may be determined according to the extracted latency tolerance level and the pre-stored corresponding relationship between the latency tolerance level and the type of the random access.

Figure 8:
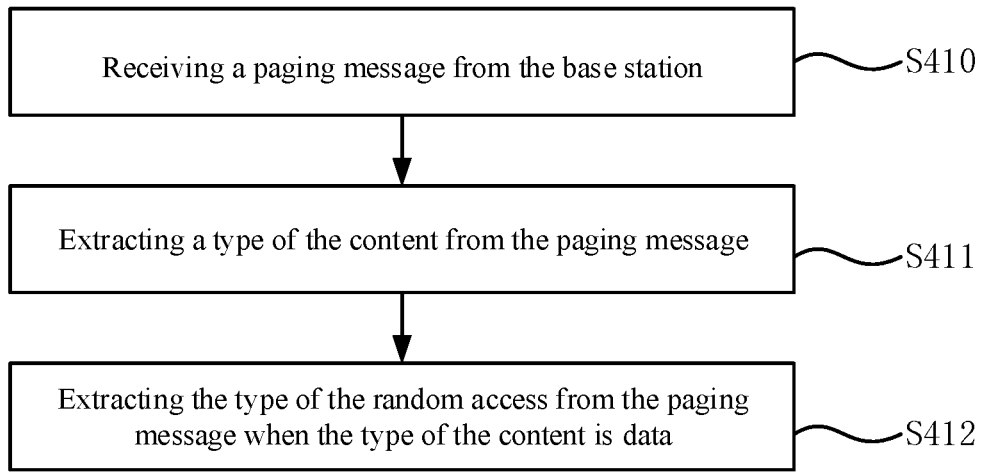
FIG. 8 is a schematic flowchart of another process of determining the type of the random access according to an exemplary embodiment of the present disclosure.

FIG. 8 is a schematic flowchart of another process of determining the type of the random access according to an exemplary embodiment of the present disclosure. As illustrated in FIG. 8, based on the embodiment as illustrated in FIG. 1, in case that the user equipment is in an idle state or in an inactive state and the process of the random access includes receiving content from the base station by the user equipment, determining the type of the random access includes the following steps:

In step S410, a paging message is received from the base station.

In step S411, a type of the content is extracted from the paging message.

In step S412, when the type of the content is data, the type of the random access is extracted from the paging message.

In one embodiment, with respect to a case where the user equipment is in the idle state or in the inactive state, when the process of initiating the random access to the base station by the user equipment includes receiving content from the base station by the user equipment, the user equipment may not determine the type of the content and the type of the random access. In this case, the type of the content and the type of the random access may be indicated in the paging message broadcast by the base station.

Specifically, the type of the random access may be indicated in the paging message, such that the user equipment may extract the type of the content from the paging message, and in the case where the content is data (the content may also be a signaling, and the indication may be given not according to this embodiment in the case where the content is the signaling), may further extract the type of the random access from the paging message, such that the type of the random access is determined.

Figure 9:
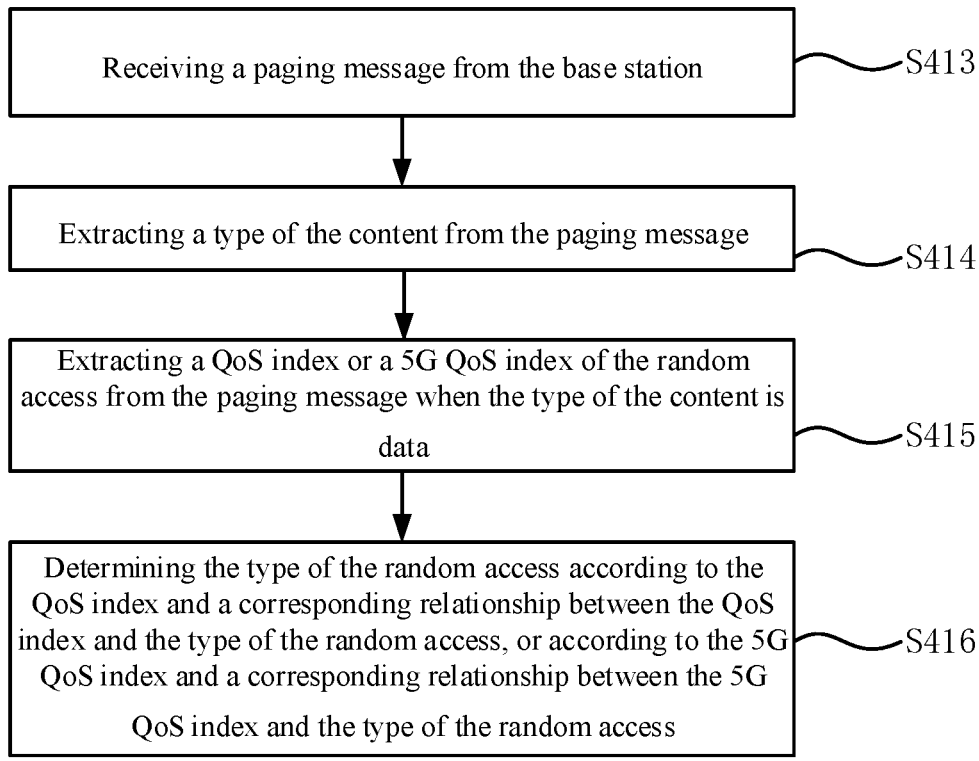
FIG. 9 is a schematic flowchart of another process of determining the type of the random access according to an exemplary embodiment of the present disclosure.

FIG. 9 is a schematic flowchart of another process of determining the type of the random access according to an exemplary embodiment of the present disclosure. As illustrated in FIG. 9, based on the embodiment as illustrated in FIG. 1, in case that the user equipment is in an idle state or in an inactive state and the process of the random access includes receiving content from the base station by the user equipment, determining the type of the random access includes the following steps:

In step S413, a paging message is received from the base station.

In step S414, a type of the content is extracted from the paging message.

In step S415, when the type of the content is data, a QoS index or a 5G QoS index of the random access is extracted from the paging message.

In step S416, the type of the random access is determined according to the QoS index and a corresponding relationship between the QoS index and the type of the random access, or according to the 5G QoS index and a corresponding relationship between the 5G QoS index and the type of the random access.

In one embodiment, with respect to a case where the user equipment is in the idle state or in the inactive state, when the process of initiating the random access to the base station by the user equipment includes receiving content from the base station by the user equipment, the user equipment may not determine the type of the content and the type of the random access. In this case, the type of the content may be indicated in the paging message broadcast by the base station, and the type of the random access may be indirectly indicated.

Specifically, the QoS index or the 5G QoS index of the random access may be indicated in the paging message, such that the user equipment may extract the type of the content from the paging message, and in the case where the content is data (the content may also be a signaling, and the indication may be given not according to this embodiment in the case where the content is the signaling), may further extract the QoS index or the 5G QoS index of the random access from the paging message, such that the type of the random access may be determined according to the QoS index and the corresponding relationship between the QoS index and the type of the random access, or according to the 5G QoS index and the corresponding relationship between the 5G QoS index and the type of the random access.

Figure 10:
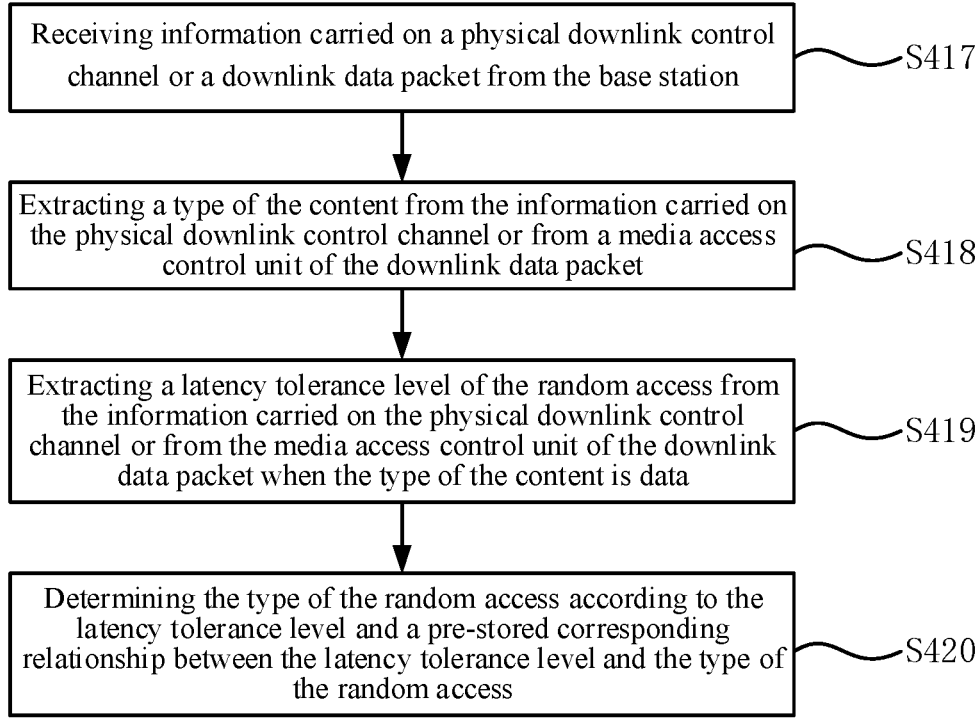
FIG. 10 is a schematic flowchart of another process of determining the type of the random access according to an exemplary embodiment of the present disclosure.

FIG. 10 is a schematic flowchart of another process of determining the type of the random access according to an exemplary embodiment of the present disclosure. As illustrated in FIG. 10, based on the embodiment as illustrated in FIG. 1, in case that the user equipment is in a connected state and the process of the random access includes receiving content from the base station by the user equipment, determining the type of the random access includes the following steps:

In step S417, information carried on a physical downlink control channel or a downlink data packet from the base station is received.

In step S418, a type of the content is extracted from the information carried on the physical downlink control channel or from a media access control unit of the downlink data packet.

In step S419, when the type of the content is data, a latency tolerance level of the random access is extracted from the information carried on the physical downlink control channel or from the media access control unit of the downlink data packet.

In step S420, the type of the random access is determined according to the latency tolerance level and a pre-stored corresponding relationship between the latency tolerance level and the type of the random access.

In one embodiment, with respect to a case where the user equipment is in the connected state, when the process of initiating the random access to the base station by the user equipment includes receiving content from the base station by the user equipment, the user equipment may not determine the type of the content and the type of the random access. In this case, the type of the content may be indicated in the information carried on the physical downlink control channel or in the downlink data packet from the base station, and the type of the random access may be indirectly indicated.

Specifically, the latency tolerance level of the random access may be indicated in the information carried on the physical downlink control channel or in the downlink data packet, such that the user equipment may extract the type of the content from the information carried on the physical downlink control channel or from the media access control unit of the downlink data packet, and in the case where the content is data (that is, downlink data, the content may also be a signaling, and the indication may be given not according to this embodiment in the case where the content is the signaling), may further extract the latency tolerance level from the information carried on the physical downlink control channel or from the media access control unit of the downlink data packet, such that the type of the random access may be determined according to the extracted latency tolerance level and the pre-stored corresponding relationship between the latency tolerance level and the type of the random access.

Figure 11:
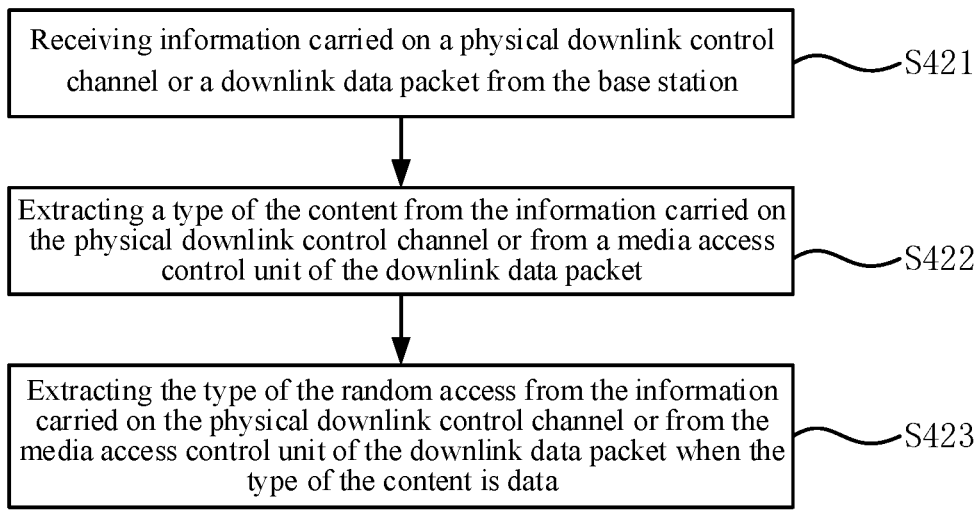
FIG. 11 is a schematic flowchart of another process of determining the type of the random access according to an exemplary embodiment of the present disclosure.

FIG. 11 is a schematic flowchart of another process of determining the type of the random access according to an exemplary embodiment of the present disclosure. As illustrated in FIG. 11, based on the embodiment as illustrated in FIG. 1, in case that the user equipment is in a connected state and the process of the random access includes receiving content from the base station by the user equipment, determining the type of the random access includes the following steps:

In step S417, information carried on a physical downlink control channel or a downlink data packet from the base station is received.

In step S422, a type of the content is extracted from the information carried on the physical downlink control channel or from a media access control unit of the downlink data packet.

In step S423, when the type of the content is data, the type of the random access is extracted from the information carried on the physical downlink control channel or from the media access control unit of the downlink data packet.

In one embodiment, with respect to a case where the user equipment is in the connected state, when the process of initiating the random access to the base station by the user equipment includes receiving content from the base station by the user equipment, the user equipment may not determine the type of the content and the type of the random access. In this case, the type of the content and the type of the random access may be indicated in the paging message broadcast by the base station.

Specifically, the type of the random access may be indicated in the information carried on the physical downlink control channel or in the downlink data packet, such that the user equipment may extract the type of the content from the information carried on the physical downlink control channel or from the media access control unit of the downlink data packet, and in the case where the content is data (the content may also be a signaling, and the indication may be given not according to this embodiment in the case where the content is the signaling), may further extract the type of the random access from the information carried on the physical downlink control channel or from the media access control unit of the downlink data packet, such that the type of the random access may be determined.

Figure 12:
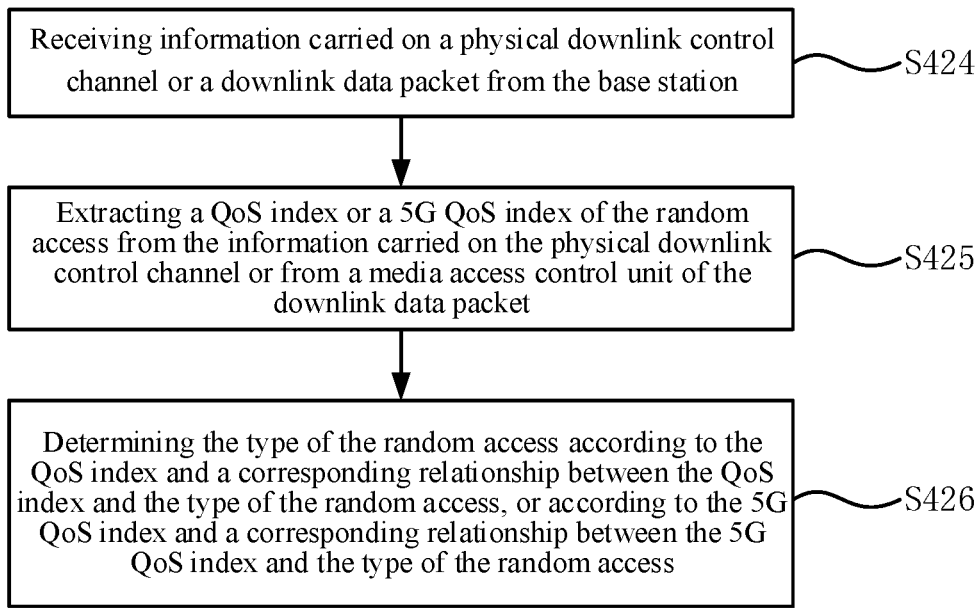
FIG. 12 is a schematic flowchart of another process of determining the type of the random access according to an exemplary embodiment of the present disclosure.

FIG. 12 is a schematic flowchart of another process of determining the type of the random access according to an exemplary embodiment of the present disclosure. As illustrated in FIG. 12, based on the embodiment as illustrated in FIG. 1, in case that the user equipment is in a connected state and the process of the random access includes receiving content from the base station by the user equipment, determining the type of the random access includes the following steps:

In step S424, information carried on a physical downlink control channel or a downlink data packet from the base station is received.

In step S425, a QoS index or a 5G QoS index of the random access is extracted from the information carried on the physical downlink control channel or from a media access control unit of the downlink data packet.

In step S426, the type of the random access is determined according to the QoS index and a corresponding relationship between the QoS index and the type of the random access, or according to the 5G QoS index and a corresponding relationship between the 5G QoS index and the type of the random access.

In one embodiment, with respect to a case where the user equipment is in the connected state, when the process of initiating the random access to the base station by the user equipment includes receiving content from the base station by the user equipment, the user equipment may not determine the type of the content and the type of the random access. In this case, the type of the content may be indicated in the information carried on the physical downlink control channel or in the downlink data packet from the base station, and the type of the random access may be indirectly indicated.

Specifically, the QoS index or the 5G QoS index of the random access may be indicated in the information carried on the physical downlink control channel or in the downlink data packet, such that the user equipment may extract the type of the content from the information carried on the physical downlink control channel or in the downlink data packet, and in the case where the content is data (the content may also be a signaling, and the indication may be given not according to this embodiment in the case where the content is the signaling), may further extract the QoS index or the 5G QoS index of the random access from the information carried on the physical downlink control channel or from the downlink data packet, such that the type of the random access may be determined according to the QoS index and the corresponding relationship between the QoS index and the type of the random access, or according to the 5G QoS index and the corresponding relationship between the 5G QoS index and the type of the random access.

Optionally, the adjustment parameter includes: a backoff time coefficient, and/or a backoff time value, and/or a power ramping step coefficient, and/or a power ramping step value.

Figure 13:
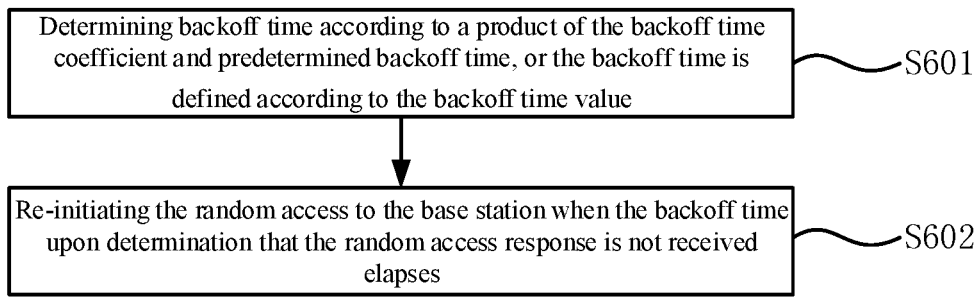
FIG. 13 is a schematic flowchart of a process of re-initiating the random access to the base station according to the random access adjustment parameter according to an exemplary embodiment of the present disclosure.

FIG. 13 is a schematic flowchart of a process of re-initiating the random access to the base station according to the random access adjustment parameter according to an exemplary embodiment of the present disclosure. As illustrated in FIG. 13, based on the embodiment as illustrated in FIG. 1, re-initiating the random access to the base station according to the random access adjustment parameter includes the following steps:

In step S601, backoff time is determined according to a product of the backoff time coefficient and predetermined backoff time, or the backoff time is defined according to the backoff time value.

In step S602, the random access is re-initiate to the base station when the backoff time upon determination that the random access response is not received elapses.

Figure 14:
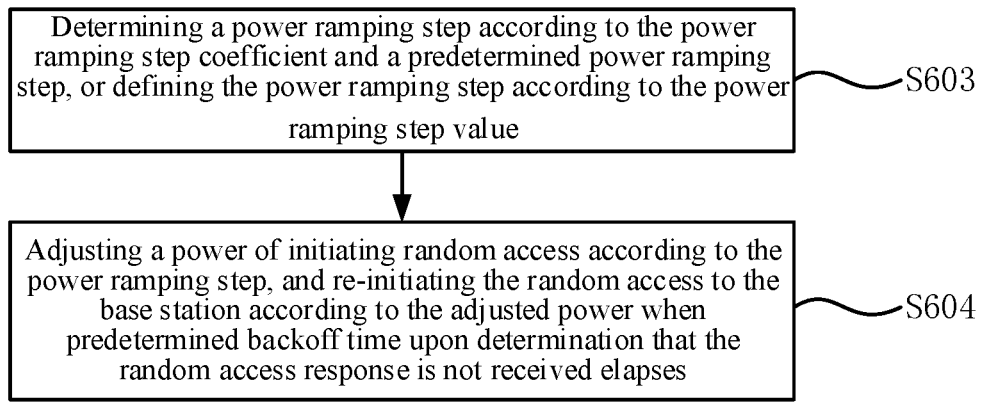
FIG. 14 is a schematic flowchart of another process of re-initiating the random access to the base station according to the random access adjustment parameter according to an exemplary embodiment of the present disclosure.

FIG. 14 is a schematic flowchart of another process of re-initiating the random access to the base station according to the random access adjustment parameter according to an exemplary embodiment of the present disclosure. As illustrated in FIG. 14, based on the embodiment as illustrated in FIG. 1, re-initiating the random access to the base station according to the random access adjustment parameter includes the following steps:

In step S603, a power ramping step is determined according to the power ramping step coefficient and a predetermined power ramping step, or the power ramping step is defined according to the power ramping step value.

In step S604, a power of initiating random access is adjusted according to the power ramping step, and the random access is re-initiated to the base station according to the adjusted power when predetermined backoff time upon determination that the random access response is not received elapses.

It should be noted that the methods for configuring random access according to the embodiments as illustrated in FIG. 1 to FIG. 14 may be applied to various types of random access events, for example, when the terminal is in the idle state or in the inactive state, transmitting data and/or signaling by the terminal, and receiving data and/or signaling by the terminal; for example, re-setting up a connection with the base station; for example, switching to a base station to be connected; for example, uplink out-of-synchronization during uplink or downlink data transmission in the primary cell group and/or secondary cell group in the connected state; for example, addition and/or modification of the secondary cell group; for example, time synchronization for the secondary cell; for example, uplink synchronization for positioning; for example, beam recovery request; for example, system information (SI) request (specifically, for example, request events with respect to system messages SIB3 and/or SIB4, or request events with respect to SIB5 and/or SIB6), which are not exhaustively enumerated herein.

Corresponding to the preceding method embodiments for configuring random access, the present disclosure further provides embodiments for an apparatus for configuring random access.

Figure 15:
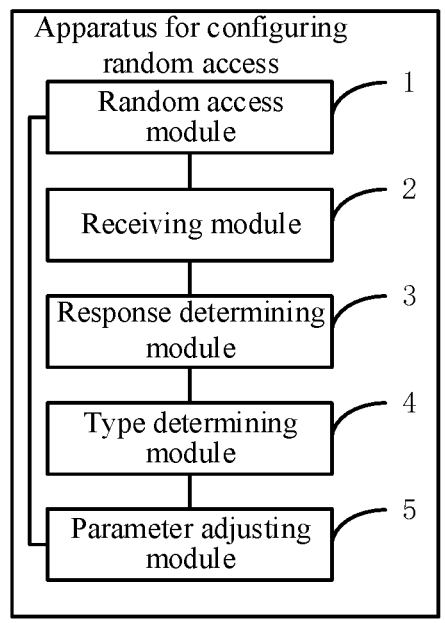
FIG. 15 is a block diagram of an apparatus for configuring random access according to an exemplary embodiment of the present disclosure.

FIG. 15 is a block diagram of an apparatus for configuring random access according to an exemplary embodiment of the present disclosure. Referring to FIG. 15, the apparatus is implemented by a user equipment, and includes:

a random access module 1, configured to initiate a random access to a base station;

a receiving module 2, configured to receive an association relationship between a random access adjustment parameter and a type of the random access from the base station, wherein the type of the random access is associated with a tolerant latency of the random access;

a response determining module 3, configured to determine whether a random access response transmitted by the base station with respect to the random access is received within a predetermined duration upon determination that the random access is initiated; and a type determining module 4, configured to determine the type of the random access upon it is determined that the random access response is not received; and a parameter adjusting module 5, configured to determine a random access adjustment parameter corresponding to the random access according to the association relationship;

wherein the random access module 1 is further configured to re-initiate the random access to the base station according to the random access adjustment parameter.

Figure 16:
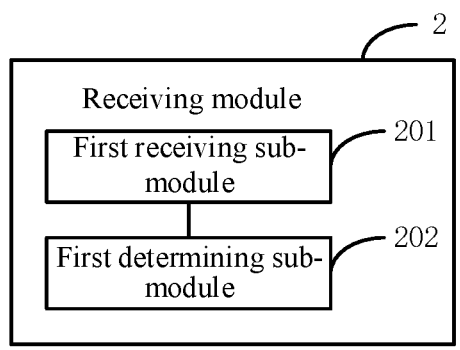
FIG. 16 is a schematic block diagram of a receiving module according to an exemplary embodiment of the present disclosure.

FIG. 16 is a schematic block diagram of a receiving module according to an exemplary embodiment of the present disclosure. As illustrated in FIG. 16, in case that the user equipment is in an idle state or in an inactive state, the receiving module 2 includes:

a first receiving sub-module 201, configured to receive a connection release message, and/or a connection reject message, and/or a connection resume message and/or a system message from the base station; and a first determining sub-module 202, configured to extract the association relationship from the received connection release message, and/or connection reject message, and/or connection resume message and/or system message.

Figure 17:
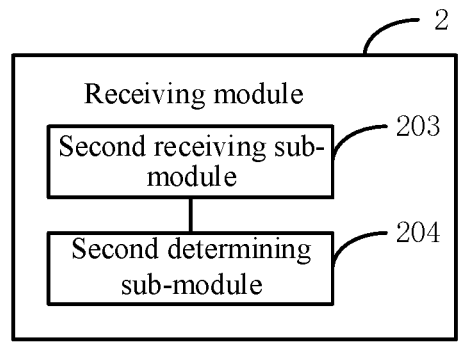
FIG. 17 is a schematic block diagram of another receiving module according to an exemplary embodiment of the present disclosure.

FIG. 17 is a schematic block diagram of another receiving module according to an exemplary embodiment of the present disclosure. As illustrated in FIG. 17, in case that the user equipment is in an idle state or in an inactive state, the receiving module 2 includes:

a second receiving sub-module 203, configured to receive a connection setup message, and/or a connection resume message, and/or a connection reconfigure message from the base station; and a second determining sub-module 204, configured to extract the association relationship from the received connection setup message, and/or connection resume message, and/or the connection reconfigure message.

Figure 18:
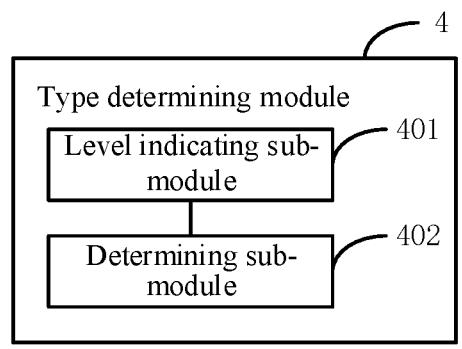
FIG. 18 is a schematic block diagram of a type determining module according to an exemplary embodiment of the present disclosure.

FIG. 18 is a schematic block diagram of a type determining module according to an exemplary embodiment of the present disclosure. As illustrated in FIG. 18, in case that the user equipment is in an idle state, in an inactive state or in a connected state and the process of the random access includes transmitting data to the base station by the user equipment, the type determining module 4 includes:

a level indicating sub-module 401, configured to indicate a latency tolerance level of the random access to an access stratum via a non-access stratum; and a determining sub-module 402, configured to determine the type of the random access via the access stratum according to the latency tolerance level and a pre-stored corresponding relationship between the latency tolerance level and the type of the random access.

Optionally, the user equipment is in an idle state, in an inactive state or in a connected state and the process of the random access includes transmitting data to the base station by the user equipment, the type determining module is configured to indicate the type of the random access to an access stratum via a non-access stratum.

Figure 19:
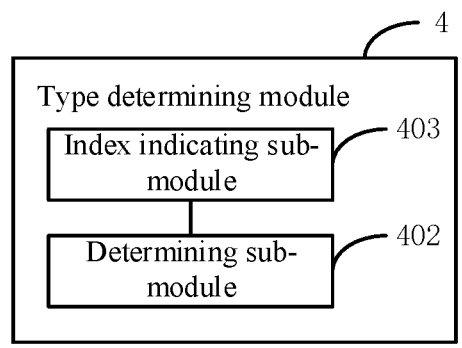
FIG. 19 is a schematic block diagram of another type determining module according to an exemplary embodiment of the present disclosure.

FIG. 19 is a schematic block diagram of another type determining module according to an exemplary embodiment of the present disclosure. As illustrated in FIG. 19, in case that the user equipment is in an idle state, in an inactive state or in a connected state and the process of the random access includes transmitting data to the base station by the user equipment, the type determining module 4 includes:

an index indicating sub-module 403, configured to indicate a QoS index or a 5G QoS index of the random access to an access stratum via a non-access stratum; and a determining sub-module 402, configured to determine the type of the random access, via the access stratum, according to the QoS index and a corresponding relationship between the QoS index and the type of the random access, or according to the 5G QoS index and a corresponding relationship between the 5G QoS index and the type of the random access.

Figure 20:
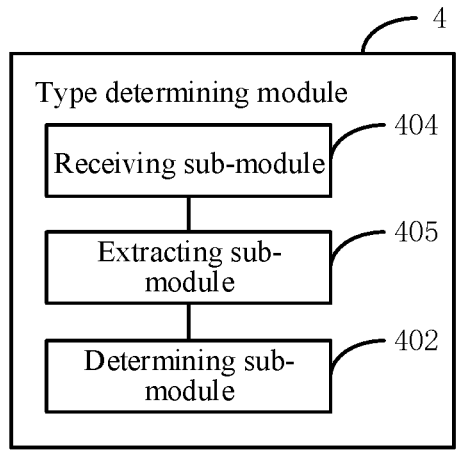
FIG. 20 is a schematic block diagram of another type determining module according to an exemplary embodiment of the present disclosure.

FIG. 20 is a schematic block diagram of another type determining module according to an exemplary embodiment of the present disclosure. As illustrated in FIG. 20, in case that the user equipment is in an idle state or in an inactive state and the process of the random access includes receiving content from the base station by the user equipment, the type determining module 4 includes:

a receiving sub-module 404, configured to receive a paging message from the base station;

a extracting sub-module 405, configured to extract a type of the content from the paging message; and extract a latency tolerance level of the random access from the paging message when the type of the content is data; and a determining sub-module 402 is configured to determine the type of the random access according to the latency tolerance level and a pre-stored corresponding relationship between the latency tolerance level and the type of the random access.

Figure 21:
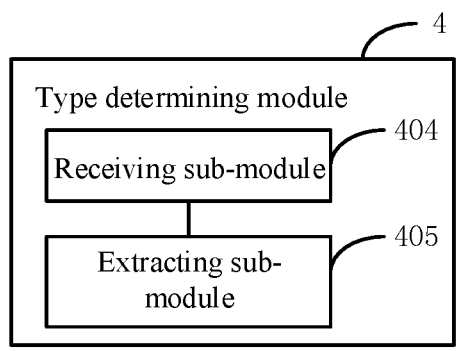
FIG. 21 is a schematic block diagram of another type determining module according to an exemplary embodiment of the present disclosure.

FIG. 21 is a schematic block diagram of another type determining module according to an exemplary embodiment of the present disclosure. As illustrated in FIG. 21, in case that the user equipment is in an idle state or in an inactive state and the process of the random access includes receiving content from the base station by the user equipment, the type determining module 4 includes:

a receiving sub-module 404, configured to receive a paging message from the base station; and an extracting sub-module 405, configured to extract a type of the content from the paging message; and extract the tape of the random access from the paging message when the type of the content is data; and Optionally, in case that the user equipment is in an idle state or in an inactive state and the process of the random access includes receiving content from the base station by the user equipment, the type determining module includes:

a receiving sub-module, configured to receive a paging message from the base station;

an extracting sub-module, configured to extract a type of the content from the paging message; and extract a QoS index or a 5G QoS index of the random access from the paging message when the type of the content is data; and a determining sub-module, configured to determine the type of the random access according to the QoS index and a corresponding relationship between the QoS index and the type of the random access, or according to the 5G QoS index and a corresponding relationship between the 5G QoS index and the type of the random access.

Optionally, in case that the user equipment is in a connected state and the process of the random access includes receiving content from the base station by the user equipment, the type determining module includes:

a receiving sub-module, configured to receive information carried on a physical downlink control channel or a downlink data packet from the base station; and an extracting sub-module, configured to extract a type of the content from the information carried on the physical downlink control channel or from a media access control unit of the downlink data packet, and extract a latency tolerance level of the random access from the information carried on the physical downlink control channel or from the media access control unit of the downlink data packet when the type of the content is data; and a determining sub-module, configured to determine the type of the random access according to the latency tolerance level and a pre-stored corresponding relationship between the latency tolerance level and the type of the random access.

Optionally, in case that the user equipment is in a connected state and the process of the random access includes receiving content from the base station by the user equipment, the type determining module includes:

a receiving sub-module, configured to receive information carried on a physical downlink control channel or a downlink data packet from the base station; and an extracting sub-module, configured to extract a type of the content from the information carried on the physical downlink control channel or from a media access control unit of the downlink data packet, and extract the type of the random access from the information carried on the physical downlink control channel or from the media access control unit of the downlink data packet when the type of the content is data.

Optionally, in case that the user equipment is in a connected state and the process of the random access includes receiving content from the base station by the user equipment, the type determining module includes:

a receiving sub-module, configured to receive information carried on a physical downlink control channel or a downlink data packet from the base station; and an extracting sub-module, configured to extract a QoS index or a 5G QoS index of the random access from the information carried on the physical downlink control channel or from a media access control unit of the downlink data packet; and a determining sub-module, configured to determine the type of the random access according to the QoS index and a corresponding relationship between the QoS index and the type of the random access, or according to the 5G QoS index and a corresponding relationship between the 5G QoS index and the type of the random access.

Optionally, the adjustment parameter includes:

a backoff time coefficient, and/or a backoff time value, and/or a power ramping step coefficient, and/or a power ramping step value.

Figure 22:
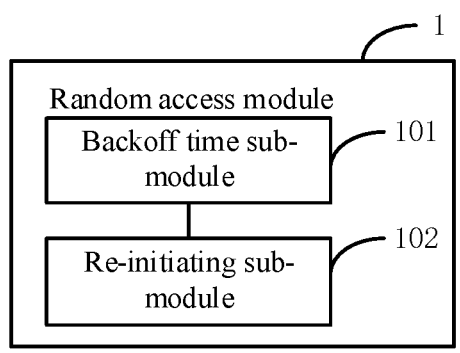
FIG. 22 is a schematic block diagram of a random access module according to an exemplary embodiment of the present disclosure.

FIG. 22 is a schematic block diagram of a random access module according to an exemplary embodiment of the present disclosure. As illustrated in FIG. 22, the random access module 1 includes:

a backoff time sub-module 101, configured to determine backoff time according to a product of the backoff time coefficient and predetermined backoff time, or define the backoff time according to the backoff time value; and a re-initiating sub-module 102, configured to re-initiate the random access to the base station when the backoff time upon determination that the random access response is not received elapses.

Figure 23:
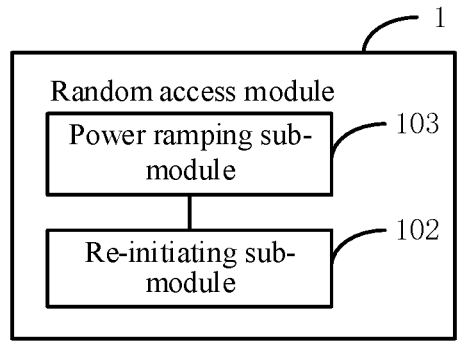
FIG. 23 is a schematic block diagram of another random access module according to an exemplary embodiment of the present disclosure.

FIG. 23 is a schematic block diagram of another random access module according to an exemplary embodiment of the present disclosure. As illustrated in FIG. 23, the random access module 1 includes:

a power ramping sub-module 103, configured to determine a power ramping step according to the power ramping step coefficient and a predetermined power ramping step, or define a power ramping step according to the power ramping step value; and a re-initiating sub-module 102, configured to adjust a power of initiating random access according to the power ramping step when predetermined backoff time upon determination that the random access response is not received elapses, and re-initiate the random access to the base station according to the adjusted power.

With respect to the apparatus in the above embodiment, details about performing corresponding operations by different modules have been described in the method embodiment, which are not given herein any further.

Since the apparatus embodiments substantially correspond to the method embodiments, the apparatus embodiments are described simply, and the relevant part may be obtained with reference to the part of the description in the method embodiments. The above described apparatus embodiments are merely for illustration purpose only. The modules which are described as separate components may be physically separated or may be not physically separated, and the components which are illustrated as modules may be or may not be physical modules, that is, the components may be located in the same position or may be distributed into a plurality of network modules. A part or all the modules may be selected according to the actual needs to achieve the objectives of the technical solutions according to the embodiments of the present disclosure. Persons of ordinary skill in the art may understand and implement the present disclosure without paying any creative effort.

An embodiment of the present disclosure further provides an electronic device. The electronic device includes:

a processor; and a memory for storing instructions executable by the processor;

wherein the processor is configured to:

initiate a random access to a base station;

receive an association relationship between a random access adjustment parameter and a type of the random access from the base station, wherein the type of the random access is associated with a tolerant latency of the random access;

determine whether a random access response transmitted by the base station with respect to the random access is received within a predetermined duration upon initiation of the random access;

determine the type of the random access upon it is determined that the random access response is not received;

determine a random access adjustment parameter corresponding to the random access according to the association relationship; and re-initiate the random access to the base station according to the random access adjustment parameter.

An embodiment of the present disclosure further provides a computer-readable storage medium, which stores a computer program; wherein the computer program, when being executed by a processor, causes the processor to perform the following steps:

initiating a random access to a base station;

receiving an association relationship between a random access adjustment parameter and a type of the random access from the base station, wherein the type of the random access is associated with a tolerant latency of the random access;

determining whether a random access response transmitted by the base station with respect to the random access is received within a predetermined duration upon initiation of the random access;

determining the type of the random access upon it is determined that the random access response is not received;

determining a random access adjustment parameter corresponding to the random access according to the association relationship; and re-initiating the random access to the base station according to the random access adjustment parameter.

Figure 24:
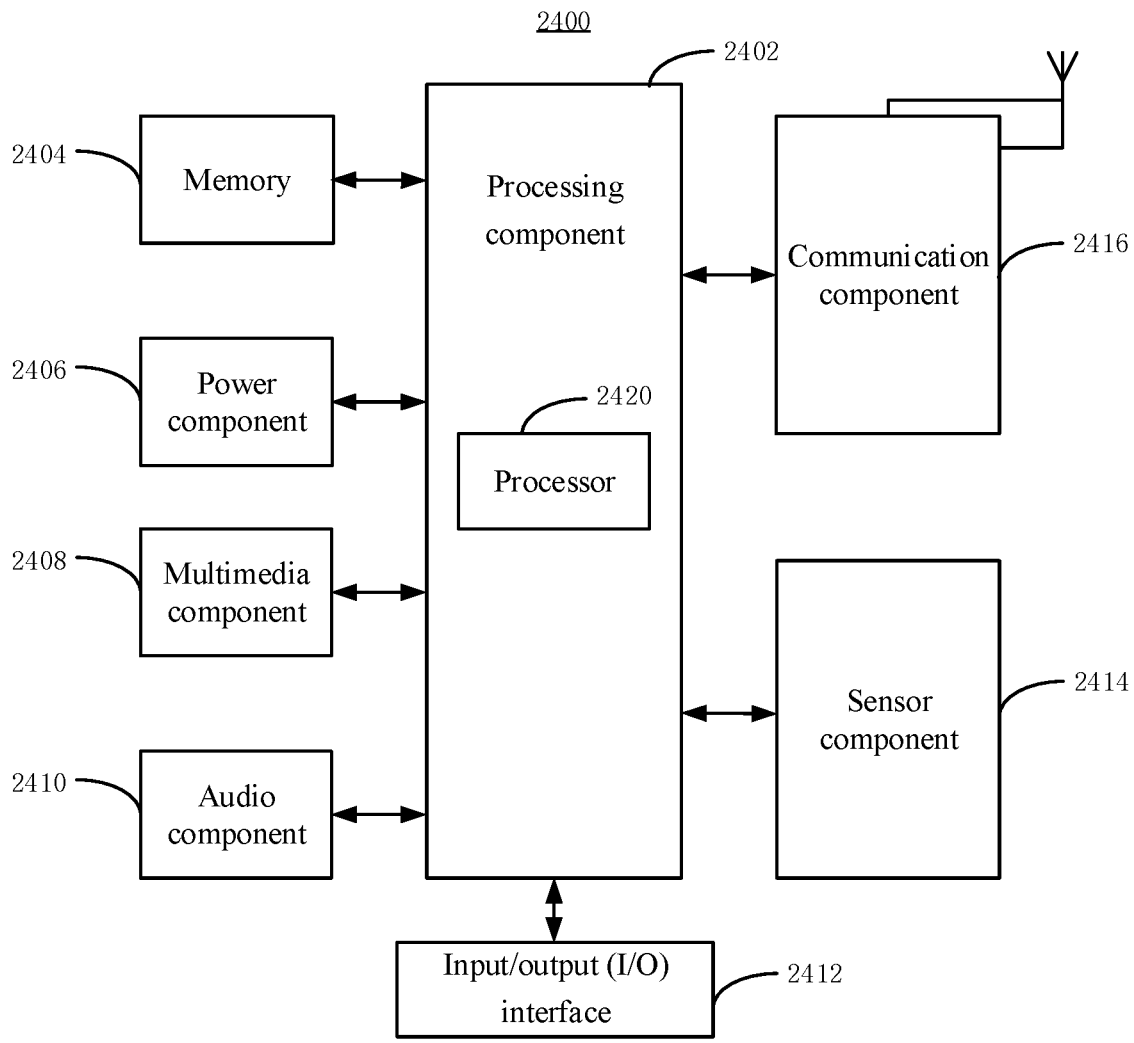
FIG. 24 is a block diagram of an apparatus for use in configuring random access according to an exemplary embodiment of the present disclosure.

FIG. 24 is a block diagram of an apparatus 2400 for use in configuring random access according to an exemplary embodiment of the present disclosure. For example, the apparatus 2400 may be a mobile phone, a computer, a digital broadcasting terminal, a message transceiver device, a gaming console, a tablet device, medical equipment, fitness equipment, personal digital assistant or the like.

Referring to FIG. 24, the apparatus 2400 may include one or more of the following components: a processing component 2402, a memory 2404, a power component 2406, a multimedia component 2408, an audio component 2410, an input/output (I/O) interface 2412, a sensor component 2414, and a communication component 2424.

The processing component 2402 typically controls overall operations of the apparatus 2400, such as the operations associated with display, telephone calls, data communications, camera operations, and recording operations. The processing component 2402 may include at least one processor 2420 to execute instructions for performing all or a part of the steps in the above method. In addition, the processing component 2402 may include one or more modules which facilitate the interaction between the processing component 2402 and other components. For example, the processing component 2402 may include a multimedia module to facilitate the interaction between the multimedia component 2408 and the processing component 2402.

The memory 2404 is operable to store various types of data to support the operations of the apparatus 2400. Examples of such data include instructions for any application or method operated on the apparatus 2400, contact data, phonebook data, messages, pictures, videos and the like. The memory 2404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 2406 provides power to various components of the apparatus 2400. The power component 2406 may include a power management system, one or more power supplies, and other components associated with the generation, management, and distribution of power in the apparatus 2400.

The multimedia component 2408 includes a screen providing an output interface between the apparatus 2400 and a user. In some embodiments, the screen may include a liquid crystal display (LCD) and a touch panel (TP). When the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2408 includes a front camera and/or a rear camera. The front camera and/or the rear camera may receive external multimedia data when the apparatus 2400 is in an operation mode, such as a photographing mode or a video mode. Each of the front camera and the rear camera may be a fixed optical lens system or have focus and optical zoom capability.

The audio component 2410 is configured to output and/or input audio signals. For example, the audio component 2410 includes a microphone (MIC) configured to receive an external audio signal when the apparatus 2400 is in an operation mode, such as a call mode, a recording mode, or a voice recognition mode. The received audio signal may be further stored in the memory 2404 or transmitted via the communication component 2416. In some embodiments, the audio component 2410 further includes a speaker to output audio signals.

The I/O interface 2412 provides an interface between the processing component 2402 and a peripheral interface module, such as a keyboard, a click wheel, a button or the like. The buttons may include, but not limited to, a home button, a volume button, a starting button, and a locking button.

The sensor component 2414 includes one or more sensors to provide status assessments of various aspects of the apparatus 2400. For example, the sensor component 2414 may detect an open/closed status of the apparatus 2400, relative positioning of components, e.g., the display and the keypad, of the apparatus 2400, a change in position of the apparatus 2400 or a component of the apparatus 2400, a presence or absence of user in contact with the apparatus 2400, an orientation or an acceleration/deceleration of the apparatus 2400, and a change in temperature of the apparatus 2400. The sensor component 2414 may include a proximity sensor configured to detect the presence of nearby objects without any physical contact. The sensor component 2414 may also include a light sensor, such as a CMOS or CCD image sensor, for use in imaging applications. In some embodiments, the sensor component 2414 may also include an accelerometer sensor, a gyroscope sensor, a magnetic sensor, a pressure sensor, or a temperature sensor.

The communication component 2416 is configured to facilitate wired or wireless communications between the apparatus 2400 and other devices. The apparatus 2400 may access a wireless network based on a communication standard, such as WiFi, 2G, 3G, 4G, 5G or a combination thereof. In one exemplary embodiment, the communication component 2416 receives a broadcast signal or broadcast associated information from an external broadcast management system over a broadcast channel. In one exemplary embodiment, the communication component 2416 further includes a near field communication (NFC) module to facilitate short-range communications.

In exemplary embodiments, the apparatus 2400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, a non-transitory computer readable storage medium including instructions is also provided, executable by the processor 2420 in the apparatus 2400, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for configuring random access, comprising:

initiating, by a user equipment, a random access to a base station;

receiving, by the user equipment, an association relationship between a random access adjustment parameter and a type of the random access from the base station, wherein the type of the random access is associated with a tolerant latency of the random access;

determining, by the user equipment, whether a random access response transmitted by the base station with respect to the random access is received within a predetermined duration upon initiation of the random access;

in response to determining that the random access response is not received, determining, by the user equipment, the type of the random access;

determining, by the user equipment, the random access adjustment parameter corresponding to the type of the random access according to the association relationship; and re-initiating, by the user equipment, the random access to the base station according to the random access adjustment parameter, wherein in response to that the user equipment is in a connected state and a process of the random access comprises receiving content from the base station by the user equipment, determining the type of the random access comprises one of followings:

receiving information carried on a physical downlink control channel or a downlink data packet from the base station; extracting a type of the content from the information carried on the physical downlink control channel or from a media access controller of the downlink data packet; extracting a latency tolerance level of the random access from the information carried on the physical downlink control channel or from the media access controller of the downlink data packet in response to that the type of the content is data; and determining the type of the random access according to the latency tolerance level and a pre-stored corresponding relationship between the latency tolerance level and the type of the random access;

receiving information carried on a physical downlink control channel or a downlink data packet from the base station; extracting a type of the content from the information carried on the physical downlink control channel or from a media access controller of the downlink data packet; and extracting the type of the random access from the information carried on the physical downlink control channel or from the media access controller of the downlink data packet in response to that the type of the content is data; and receiving information carried on a physical downlink control channel or a downlink data packet from the base station; extracting a Quality of Service (QoS) index or a 5G QoS index of the random access from the information carried on the physical downlink control channel or from a media access controller of the downlink data packet; and determining the type of the random access according to the QoS index and a corresponding relationship between the QoS index and the type of the random access, or according to the 5G QoS index and a corresponding relationship between the 5G QoS index and the type of the random access.

2. The method according to claim 1, wherein in response to that the user equipment is in an idle state or in an inactive state, receiving, by the user equipment, the association relationship between the random access adjustment parameter and the type of the random access from the base station comprises one of followings:

receiving at least one of following messages: a connection release message, a connection reject message, a connection resume message, and a system message from the base station; and extracting the association relationship from at least one of following messages: the received connection release message, the received connection reject message, the received connection resume message, and the received system message; and receiving at least one of following messages: a connection setup message, a connection resume message, and a connection reconfigure message from the base station; and extracting the association relationship from at least one of following messages: the received connection setup message, the received connection resume message, and the received connection reconfigure message.

3. The method according to claim 1, wherein in response to that the user equipment is in an idle state, in an inactive state or in a connected state and a process of the random access comprises transmitting data to the base station by the user equipment, determining the type of the random access comprises one of followings:

indicating, by a non-access stratum, a latency tolerance level of the random access to an access stratum; and determining, by the access stratum, the type of the random access according to the latency tolerance level and a pre-stored corresponding relationship between the latency tolerance level and the type of the random access;

indicating, by a non-access stratum, the type of the random access to an access stratum; and indicating, by a non-access stratum, a Quality of Service (QoS) index or a 5G QoS index of the random access to an access stratum; and determining, by the access stratum, the type of the random access according to the QoS index and a corresponding relationship between the QoS index and the type of the random access, or according to the 5G QoS index and a corresponding relationship between the 5G QoS index and the type of the random access.

4. The method according to claim 1, wherein in response to that the user equipment is in an idle state or in an inactive state and a process of the random access comprises receiving content from the base station by the user equipment, determining, by the user equipment, the type of the random access comprises one of followings:

receiving a paging message from the base station; extracting a type of the content from the paging message; extracting a latency tolerance level of the random access from the paging message in response to that the type of the content is data; and determining the type of the random access according to the latency tolerance level and a pre-stored corresponding relationship between the latency tolerance level and the type of the random access;

receiving a paging message from the base station; extracting a type of the content from the paging message; extracting the type of the random access from the paging message in response to that the type of the content is data; and receiving a paging message from the base station; extracting a type of the content from the paging message; extracting a Quality of Service (QoS) index or a 5G QoS index of the random access from the paging message in response to that the type of the content is data; and determining the type of the random access according to the QoS index and a corresponding relationship between the QoS index and the type of the random access, or according to the 5G QoS index and a corresponding relationship between the 5G QoS index and the type of the random access.

5. The method according to claim 1, wherein the random access adjustment parameter comprises at least one of followings:

a backoff time coefficient, a backoff time value, a power ramping step coefficient, and a power ramping step value.

6. The method according to claim 5, wherein re-initiating, by the user equipment, the random access to the base station according to the random access adjustment parameter comprises:

determining, by the user equipment, backoff time according to a product of the backoff time coefficient and predetermined backoff time; and re-initiating, by the user equipment, the random access to the base station in response to that the backoff time upon determination that the random access response is not received elapses.

7. The method according to claim 5, wherein re-initiating, by the user equipment, the random access to the base station according to the random access adjustment parameter comprises:

determining, by the user equipment, a power ramping step according to the power ramping step coefficient and a predetermined power ramping step; and adjusting, by the user equipment, a power of initiating the random access according to the power ramping step, and re-initiating the random access to the base station according to the adjusted power in response to that predetermined backoff time upon determination that the random access response is not received elapses.

8. A user equipment for configuring random access, comprising:

one or more processors;

a non-transitory storage coupled to the one or more processors; and a plurality of programs stored in the non-transitory storage that, when executed by the one or more processors, cause the user equipment to perform acts comprising:

initiating a random access to a base station;

receiving an association relationship between a random access adjustment parameter and a type of the random access from the base station, wherein the type of the random access is associated with a tolerant latency of the random access;

determining whether a random access response transmitted by the base station with respect to the random access is received within a predetermined duration upon initiation of the random access;

in response to determining that the random access response is not received, determining the type of the random access;

determining the random access adjustment parameter corresponding to the type of the random access according to the association relationship; and re-initiating the random access to the base station according to the random access adjustment parameter, wherein in response to that the user equipment is in a connected state and a process of the random access comprises receiving content from the base station by the user equipment, the plurality of programs cause the user equipment to perform acts comprising one of followings:

receiving information carried on a physical downlink control channel or a downlink data packet from the base station; extracting a type of the content from the information carried on the physical downlink control channel or from a media access controller of the downlink data packet, and extracting a latency tolerance level of the random access from the information carried on the physical downlink control channel or from the media access controller of the downlink data packet in response to that the type of the content is data; and determining the type of the random access according to the latency tolerance level and a pre-stored corresponding relationship between the latency tolerance level and the type of the random access;

receiving information carried on a physical downlink control channel or a downlink data packet from the base station; and extracting a type of the content from the information carried on the physical downlink control channel or from a media access controller of the downlink data packet, and extracting the type of the random access from the information carried on the physical downlink control channel or from the media access controller of the downlink data packet in response to that the type of the content is data; and receiving information carried on a physical downlink control channel or a downlink data packet from the base station; extracting a Quality of Service (QoS) index or a 5G QoS index of the random access from the information carried on the physical downlink control channel or from a media access controller of the downlink data packet; and determining the type of the random access according to the QoS index and a corresponding relationship between the QoS index and the type of the random access, or according to the 5G QoS index and a corresponding relationship between the 5G QoS index and the type of the random access.

9. The user equipment according to claim 8, wherein in response to that the user equipment is in an idle state or in an inactive state, the plurality of programs cause the user equipment to perform acts comprising one of followings:

receiving at least one of following messages: a connection release message, a connection reject message, a connection resume message, and a system message from the base station; and extracting the association relationship from at least one of following messages: the received connection release message, the received connection reject message, the received connection resume message and the received system message; and receiving at least one of following messages: a connection setup message, a connection resume message, and a connection reconfigure message from the base station; and extracting the association relationship from at least one of following messages: the received connection setup message, the received connection resume message, and the received connection reconfigure message.

10. The user equipment according to claim 8, wherein in response to that the user equipment is in an idle state, in an inactive state or in a connected state and a process of the random access comprises transmitting data to the base station by the user equipment, the plurality of programs cause the user equipment to perform acts comprising one of followings:

indicating a latency tolerance level of the random access to an access stratum via a non-access stratum; and determining the type of the random access via the access stratum according to the latency tolerance level and a pre-stored corresponding relationship between the latency tolerance level and the type of the random access;

indicating the type of the random access to an access stratum via a non-access stratum; and indicating a Quality of Service (QoS) index or a 5G QoS index of the random access to an access stratum via a non-access stratum; and determining the type of the random access, via the access stratum, according to the QoS index and a corresponding relationship between the QoS index and the type of the random access, or according to the 5G QoS index and a corresponding relationship between the 5G QoS index and the type of the random access.

11. The user equipment according to claim 8, wherein in response to that the user equipment is in an idle state or in an inactive state and a process of the random access comprises receiving content from the base station by the user equipment, the plurality of programs cause the user equipment to perform acts comprising one of followings:

receiving a paging message from the base station; extracting a type of the content from the paging message, and extracting a latency tolerance level of the random access from the paging message in response to that the type of the content is data; and determining the type of the random access according to the latency tolerance level and a pre-stored corresponding relationship between the latency tolerance level and the type of the random access;

receiving a paging message from the base station; extracting a type of the content from the paging message; extracting the type of the random access from the paging message in response to that the type of the content is data; and receiving a paging message from the base station; extracting a type of the content from the paging message; extracting a Quality of Service (QoS) index or a 5G QoS index of the random access from the paging message in response to that the type of the content is data; and determining the type of the random access according to the QoS index and a corresponding relationship between the QoS index and the type of the random access, or according to the 5G QoS index and a corresponding relationship between the 5G QoS index and the type of the random access.

12. The user equipment according to claim 8, wherein the random access adjustment parameter comprises at least one of followings:

a backoff time coefficient, a backoff time value, a power ramping step coefficient, and a power ramping step value.

13. The user equipment according to claim 12, wherein the plurality of programs cause the user equipment to perform acts comprising:
  determining backoff time according to a product of the backoff time coefficient and predetermined backoff time; and
  re-initiating the random access to the base station in response to that the backoff time upon determination that the random access response is not received elapses.

14. The user equipment according to claim 12, wherein the plurality of programs cause the user equipment to perform acts comprising:
  determining a power ramping step according to the power ramping step coefficient and a predetermined power ramping step; and
  adjusting a power of initiating random access according to the power ramping step in response to that predetermined backoff time upon determination that the random access response is not received elapses, and re-initiating the random access to the base station according to the adjusted power.

15. A non-transitory computer readable storage medium storing a plurality of programs for execution by a user equipment having one or more processors, wherein the plurality of programs, when executed by the one or more processors, cause the user equipment to:
  initiate a random access to a base station;
  receive an association relationship between a random access adjustment parameter and a type of the random access from the base station, wherein the type of the random access is associated with a tolerant latency of the random access;
  determine whether a random access response transmitted by the base station with respect to the random access is received within a predetermined duration upon initiation of the random access;
  in response to determining that the random access response is not received, determine the type of the random access;
  determine the random access adjustment parameter corresponding to the type of the random access according to the association relationship; and
  re-initiate the random access to the base station according to the random access adjustment parameter,
  wherein in response to that the user equipment is in a connected state and a process of the random access comprises receiving content from the base station by the user equipment, determining the type of the random access comprises one of followings:
    receiving information carried on a physical downlink control channel or a downlink data packet from the base station; extracting a type of the content from the information carried on the physical downlink control channel or from a media access controller of the downlink data packet; extracting a latency tolerance level of the random access from the information carried on the physical downlink control channel or from the media access controller of the downlink data packet in response to that the type of the content is data; and determining the type of the random access according to the latency tolerance level and a pre-stored corresponding relationship between the latency tolerance level and the type of the random access;
    receiving information carried on a physical downlink control channel or a downlink data packet from the base station; extracting a type of the content from the information carried on the physical downlink control channel or from a media access controller of the downlink data packet; and extracting the type of the random access from the information carried on the physical downlink control channel or from the media access controller of the downlink data packet in response to that the type of the content is data; and
    receiving information carried on a physical downlink control channel or a downlink data packet from the base station; extracting a Quality of Service (QoS) index or a 5G QoS index of the random access from the information carried on the physical downlink control channel or from a media access controller of the downlink data packet; and determining the type of the random access according to the QoS index and a corresponding relationship between the QoS index and the type of the random access, or according to the 5G QoS index and a corresponding relationship between the 5G QoS index and the type of the random access.

16. The method according to claim 5, wherein re-initiating, by the user equipment, the random access to the base station according to the random access adjustment parameter comprises:
  defining, by the user equipment, backoff time according to the backoff time value; and
  re-initiating, by the user equipment, the random access to the base station in response to that the backoff time upon determination that the random access response is not received elapses.

17. The method according to claim 5, wherein re-initiating, by the user equipment, the random access to the base station according to the random access adjustment parameter comprises:
  defining, by the user equipment, a power ramping step according to the power ramping step value; and
  adjusting, by the user equipment, a power of initiating random access according to the power ramping step, and re-initiating, by the user equipment, the random access to the base station according to the adjusted power in response to that predetermined backoff time upon determination that the random access response is not received elapses.

18. The user equipment according to claim 12, wherein the plurality of programs cause the user equipment to perform acts comprising one of followings:
  determining backoff time according to the backoff time value; and re-initiating the random access to the base station in response to that the backoff time upon determination that the random access response is not received elapses; and
  defining the power ramping step according to the power ramping step value; and adjusting a power of initiating random access according to the power ramping step in response to that predetermined backoff time upon determination that the random access response is not received elapses, and re-initiating the random access to the base station according to the adjusted power.

19. The user equipment according to claim 12, wherein the plurality of programs cause the user equipment to perform acts comprising one of followings:
  defining a power ramping step according to the power ramping step value; and
  adjusting a power of initiating random access according to the power ramping step, and re-initiating, by the user equipment, the random access to the base station according to the adjusted power in response to that predetermined backoff time upon determination that the random access response is not received elapses.

20. The non-transitory computer readable storage medium according to claim 15, wherein in response to that the user equipment is in an idle state or in an inactive state, receiving the association relationship between the random access adjustment parameter and the type of the random access from the base station comprises one of followings:
  receiving at least one of following messages: a connection release message, a connection reject message, a connection resume message, and a system message from the base station; and extracting the association relationship from at least one of following messages: the received connection release message, the received connection reject message, the received connection resume message, and the received system message; and
  receiving at least one of following messages: a connection setup message, a connection resume message, and a connection reconfigure message from the base station; and extracting the association relationship from at least one of following messages: the received connection setup message, the received connection resume message, and the received connection reconfigure message.

* * * * *